United States Patent [19]

Asakawa

[11] Patent Number: 5,953,394
[45] Date of Patent: Sep. 14, 1999

[54] CONTROL SYSTEM FOR VOICE MAIL SYSTEM

[75] Inventor: Hiroshi Asakawa, Tokyo, Japan

[73] Assignee: NEC Corporation, Tokyo, Japan

[21] Appl. No.: 08/848,188

[22] Filed: Apr. 29, 1997

[30] Foreign Application Priority Data

Apr. 30, 1996 [JP] Japan ................................ 8-109251

[51] Int. Cl.⁶ .......................... H04M 3/50; H04M 1/24
[52] U.S. Cl. .................... 379/88.25; 379/1; 379/88.18; 379/230
[58] Field of Search .................. 379/67.1, 88.07, 379/88.17, 88.18, 88.22, 88.27, 229, 230, 207, 221

[56] References Cited

U.S. PATENT DOCUMENTS

| | | | |
|---|---|---|---|
| 5,029,199 | 7/1991 | Jones et al. | 379/88.25 |
| 5,142,527 | 8/1992 | Barbier et al. | 370/62 |
| 5,345,497 | 9/1994 | Amoroso et al. | 379/84 |
| 5,657,376 | 8/1997 | Expeut et al. | 379/211 |
| 5,781,615 | 7/1998 | Bales et al. | 379/93.01 |
| 5,822,401 | 10/1998 | Cave et al. | 379/34 |

FOREIGN PATENT DOCUMENTS

| | | |
|---|---|---|
| 3-035655 | 2/1991 | Japan . |
| 3-041854 | 2/1991 | Japan . |
| 3-220849 | 9/1991 | Japan . |
| 6-164729 | 6/1994 | Japan . |

*Primary Examiner*—Daniel S. Hunter
*Attorney, Agent, or Firm*—Foley & Lardner

[57] ABSTRACT

A conventional voice mail system is disadvantageous in that it is low in expandability, reliability, processing capacity at the busiest time and maintainability of the system and it is difficult to cope with trouble when it occurs or when a new service is to be introduced. A control system for a voice mail system of the present invention includes switching units 2 for connecting voice mail system 100 and switching systems 1 path connected to subscribers 6 via lines, voice data management units 3 for producing and sending voice data guidance, voice data storage units 5 for storing and reproducing voice data, and service control unit 8 connected to switching systems 1 via signaling network 7 for controlling entire voice mail system 100. Service control unit 8 controls the other components 2 to 5 of voice mail system 100 to receive and execute an instruction of a service request from any subscriber 6, and selects, when a component of an arbitrary kind of voice mail system 100 is not in an available condition, another component of the same kind in place of the unavailable component.

11 Claims, 3 Drawing Sheets

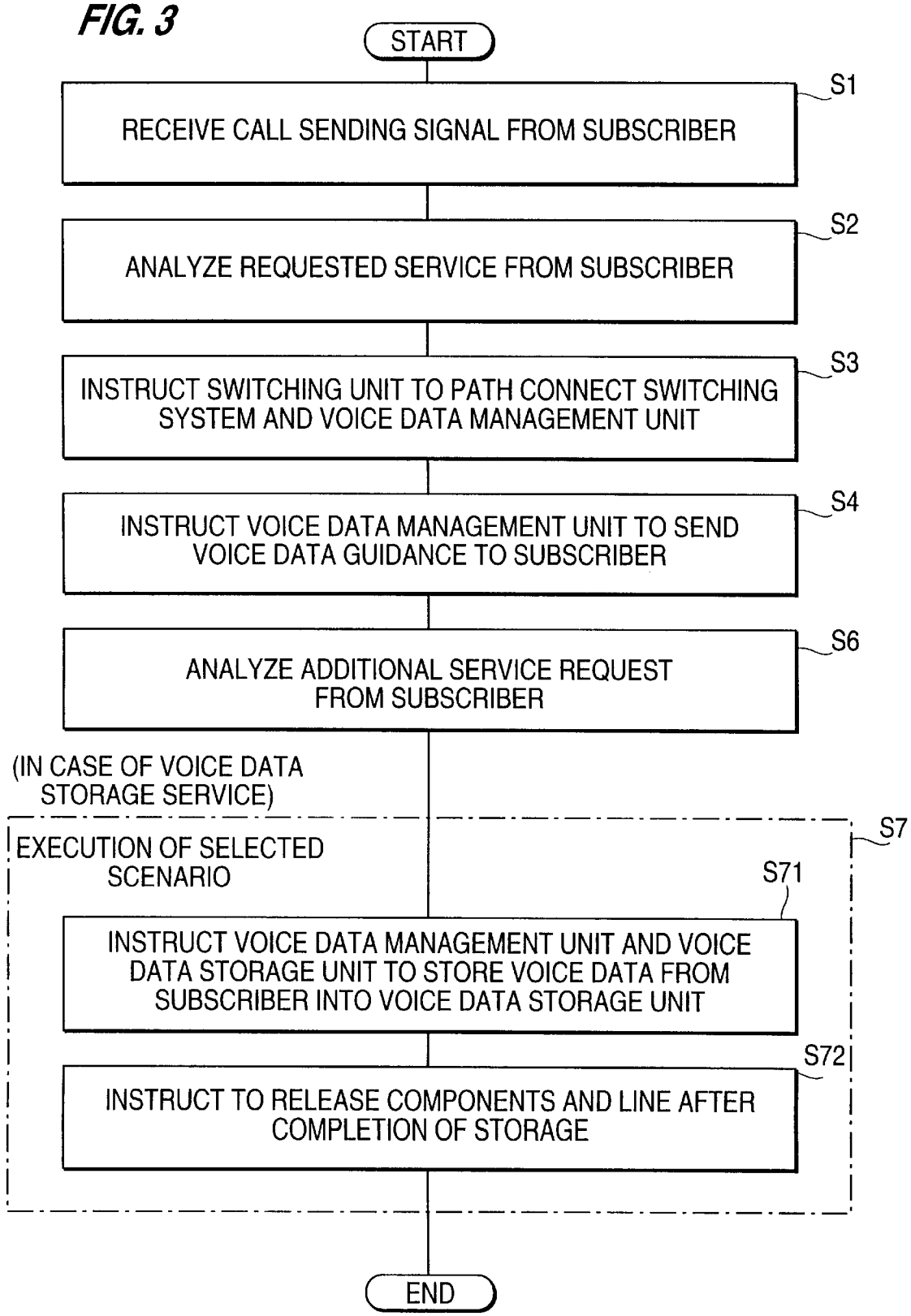

CONTROL SYSTEM FOR VOICE MAIL SYSTEM

BACKGROUND OF THE INVENTION

1. Field of the Invention

The present invention relates to a voice mail system for a switching network, and more particularly to a control system for a voice mail system.

2. Description of the Related Art

FIG. 1 shows a voice mail system to which a voice data transfer system disclosed in Japanese Patent Laid-open Application No. 164729/94 is applied.

Referring to FIG. 1, voice mail system 20 is provided together with switching system 10. Voice mail system 20 includes buffer memory (hereinafter referred to as RAM) 20a, disk unit (hereinafter referred to as DK) 20b, and CPU 20c, and is connected to switching system 10 via downward highway 30a and upward highway 30b.

Voice data sent from subscriber 40 are transferred to voice mail system 20 via switching system 10 and downward highway 30a. The voice data are stored once into RAM 20a under the control of CPU 20c in voice mail system 20. The stored voice data are written in a fixed amount into RAM 20a and then written from RAM 20a into DK 20b.

The first problem of the prior art described above resides in that the expandability of the system is low. The reason for this is that, of the two possible ways of coping with an increase in the number of subscribers and the volume of voice data, the parts increase method, whereby the number of RAMs installed is increased or the capacity of the disk unit is increased, is limited by the processing capacity of the CPU and the apparatus increase method, whereby an additional voice mail system is installed requires distribution processing to be performed by a switching system side which requires modifying the software of the switching system.

The second problem of the prior art described above resides in that the reliability of the system is low. The reason for this is that, since the voice mail system is provided together with the switching system, if the voice mail system fails partially, then all services are stopped and subscribers accommodated in the switching system connected to the voice mail system cannot enjoy voice mail services any more. In other words, since a buffer memory and a disk unit are coupled closely to each other in one apparatus, even if the disk apparatus operates normally, if an interface between the switching system and the voice mail system or the buffer memory suffers from a trouble, then it is difficult to continue services.

The third problem of the prior art described above resides in that the processing capacity of the system at the busiest time is low. The reason for this is that, since the voice mail system is provided together with the switching system, if subscribers accommodated in the same switching system request for services at the same time, then requests for processing are concentrated in the particular voice mail system, and consequently, it is difficult to process traffic at the busiest time in a decentralized manner and the processing capacity is degraded extremely.

The fourth problem of the prior art described above resides in that the maintainability of the system is low and it is difficult for the system to cope with new services. The reason for this is that, since the prior art has such a simple structure that the voice mail system is provided together with the switching system, when it is necessary to add new services in accordance with requests of individual users, the hardware and the software of the voice mail system must be modified all along the line. In other words, in modifying the hardware, an operation of stopping the voice mail system totally and exchanging the voice mail system is required, and in modifying the software, since a service executable program is executed by each individual voice mail system, it is required to stop the programs of the voice mail systems and rewrite the executable programs totally.

SUMMARY OF THE INVENTION

In view of such circumstances as described above, it is an object of the present invention to provide a control system which enhances the reliability, the expandability, the processing capacity and the maintainability of a voice mail system.

In order to attain the object described above, there is provided a control system for a voice mail system, comprising:

switching units for path connecting the voice mail system and switching systems connected to subscribers via lines;

voice data management units for producing and sending voice data guidance;

voice data storage units for storing and reproducing voice data; and a service control unit connected to the switching systems via a signaling network for controlling the entire voice mail system; and wherein the service control unit controls the other components of the voice mail system to receive and execute an instruction of a service request from any of the subscribers, and selects, when a first component of an arbitrary kind of the voice mail system is not in an available condition, another second component of the same kind in place of the first component.

Each of the switching units may include:

means for sending subscriber voice data sent from the switching system, which any of the subscribers intends to store, to the voice data management unit designated by the service control unit;

means for sending reproduced voice data of the subscriber or the voice data guidance sent from the voice data management unit to the switching system designated by the service control unit; and means for sending, when the switching unit is not in an available condition, to the service control unit a notification that the switching unit is not in an available condition.

Each of the voice data management units may include:

means for sending the subscriber voice data sent from the corresponding switching unit to the voice data storage unit designated by the service control unit;

means for producing the voice data guidance to be sent to the subscriber via the corresponding switching system and sending the produced voice data guidance to the switching unit designated by the service control unit;

means for sending reproduced voice data of the subscriber voice data reproduced by and sent from the voice data storage unit in which the subscriber voice data are stored to the switching unit designated by the service control unit; and means for sending, when the voice data management unit is not in an available condition, to the service control unit a notification that the voice data management unit is not in an available condition.

Each of the voice data storage units may include:

means for writing the subscriber voice data sent from any of the voice data management units into the voice data storage unit designated by the service control unit;

means for reproducing the subscriber voice data stored in the voice data storage unit and sending the reproduced voice data of the subscriber voice data to the voice data management unit designated by the service control unit; and means for sending, when the voice data storage unit is not in an available condition, to the service control unit a notification that the voice data storage unit is not in an available condition.

The service control unit may include:

means for selecting an appropriate switching unit when receiving a request for voice mail service from any of the subscribers via the signaling network and sending an instruction to the selected switching unit to path connect the switching system and the voice data management unit;

means for selecting an appropriate voice data management unit when receiving a request from a subscriber and sending an instruction to the selected voice data management unit to send voice data guidance to the switching system via the line connected to the switching unit;

means for selecting an appropriate voice data storage unit when receiving a request from a subscriber and sending an instruction to the selected voice storage unit to connect the voice data storage unit and the voice data management unit;

means for receiving a subscriber service request via the voice data management unit and analyzing the requested service;

means for sending an instruction, in response to requested service, to the selected switching unit, voice data management unit and voice data storage unit;

means after execution of the requested subscriber service for sending an instruction to the switching unit, voice data management unit and voice data storage unit, to release the selected switching unit, voice data management unit, voice data storage unit and line; and means for sending, when at least one of the switching units, the voice data management units and the voice data storage units is not in an available condition, an instruction to change the switching unit, voice data management unit or voice data storage unit to be selected.

(1) The present invention allows flexible system construction in accordance with the traffic using the required services by providing facilities of the desired scale and facilitates addition of additional services to enhance the expandability of the system. The reason for this is that, since the voice mail system is separated into switching unit, voice data management unit, voice data storage unit and service control unit components and the service control unit controls the other components, additional components to the system can be provided individually as traffic on the voice mail service increases.

(2) The present invention allows enhancement of the reliability of the entire system. The reason for this is that, since a plurality of units are provided for each kind of component so that the system may have a redundancy construction, even if part of any of the switching units, voice data management units and voice data storage units suffers from a trouble, the service control unit performs control to re-distribute the processing of the component in which the trouble has occurred to another component so that the processing can be taken over immediately, and therefore, the service is not interrupted at all.

(3) The present invention allows enhancement of the processing capacity for an instruction of a service request from a subscriber. The reason for this is that, since the voice mail system is constructed from a plurality of switching units, voice data management units, voice data storage units and service control unit, the traffic can be distributed dynamically to effect distributed processing.

(4) The present invention allows enhancement of the maintainability and facilitates introduction of new service. The reason for this is that, since the service control unit performs control of services as a whole, when exchanging of files is to be performed upon introduction of a new service or the like, the new service can be introduced without interruption of services by changing a service scenario of the service control unit.

(5) In this manner, according to the present invention, since the service control unit controls the entire voice mail system, the plurality of components of the voice mail system can be controlled in a unified manner, and consequently, the reliability, expandability, processing capacity and maintainability of the system can be enhanced and control when a new service is to be introduced or when a trouble occurs can be operated collectively.

The above and other objects, features, and advantages of the present invention will become apparent from the following description based on the accompanying drawings which illustrate an example of a preferred embodiment of the present invention.

BRIEF DESCRIPTION OF THE DRAWINGS

FIG. 3 is a flow chart showing a processing flow of a voice data storage service of a service control unit.

DETAILED DESCRIPTION OF THE PREFERRED EMBODIMENT

An embodiment of the present invention is described in detail below with reference to the drawings.

[1] Description of the Construction

Figure 1:
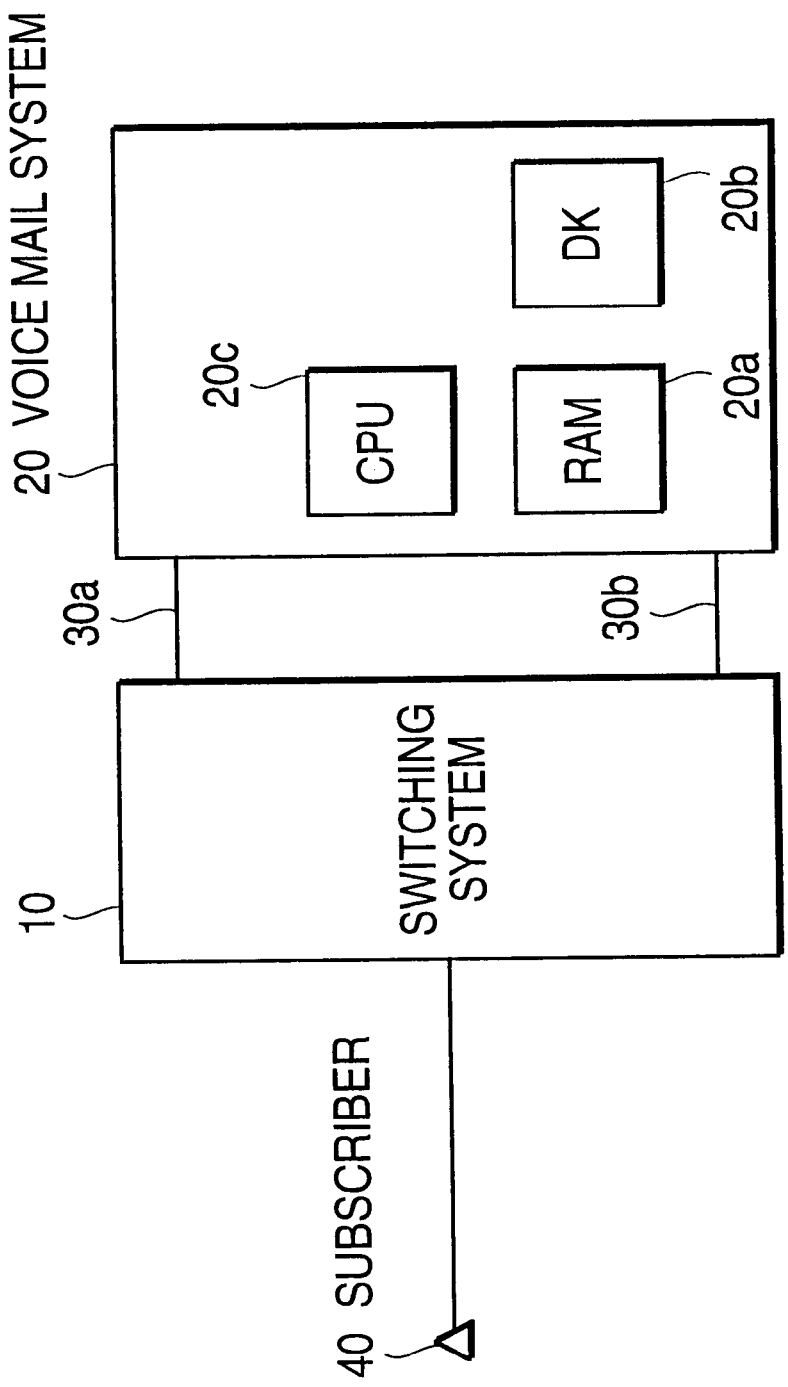
FIG. 1 is a block diagram showing a voice mail system to which a voice data transfer system of the prior art is applied.
Figure 2:
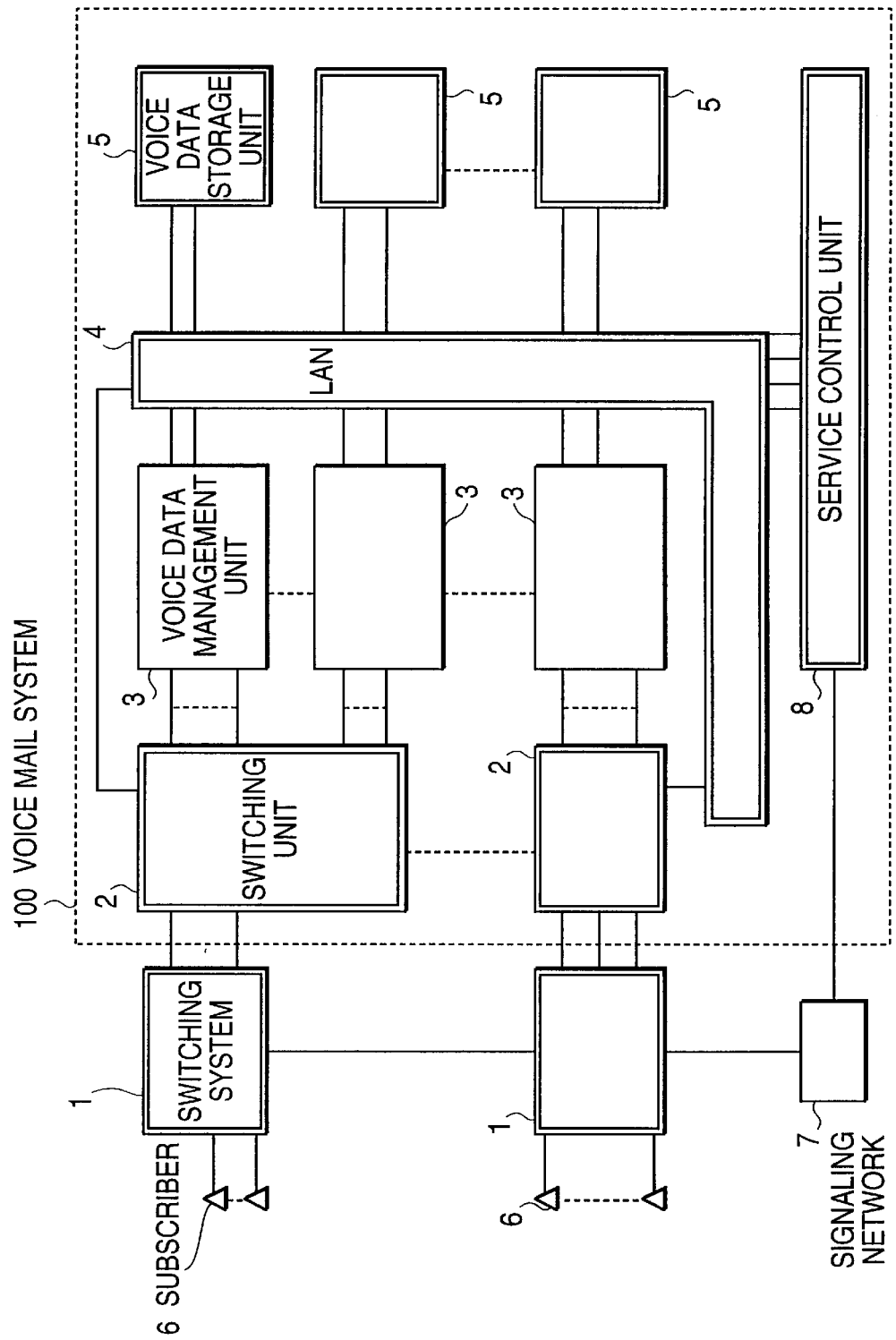
FIG. 2 is a block diagram showing a voice mail system to which the present invention is applied.

The construction is described with reference to FIG. 2. In voice mail system 100 shown in FIG. 2, when a call for a voice data storage service is sent from subscriber 6, a call sending notification is outputted from switching system 1 to service control unit 8 via signaling network 7. Service control unit 8 receives the call sending notification and instructs switching system 1, switching unit 2, voice data management unit 3 and voice data storage unit 5 for connection of subscriber 6 to switching system 1, switching unit 2, voice data management unit 3 and voice data storage unit 5. After a line is connected, voice data sent from subscriber 6 are stored into voice data storage unit 5 via switching system 1, switching unit 2 and voice data management unit 3 in accordance with an instruction of service control unit 8.

LAN (local area network) 4 connects the components like a mesh and provides high quality communication environment between the components. Service control unit 8 and switching units 2, voice data management units 3 and voice data storage units 5 are connected to each other via LAN 4, and an instruction sent from service control unit 8 is sent as a control signal to the individual components via LAN 4. Also voice data to be communicated between voice data management unit 3 and voice data storage unit 5 are sent via LAN 4.

A plurality of subscribers 6 are connected to each switching system 1. Therefore, a number of switching units 2 and voice data management units 3 corresponding to the traffic of voice mail services are provided for each switching system 1.

Only the required numbers of switching units 2, voice data management units 3 and voice data storage units 5 need to be additionally provided.

Switching units 2 and voice data storage units 5 are dual systems. Service control unit 8 controls the components and controls the entire system. For service control unit 8, a fault-tolerant computer having a sufficient processing capacity to control the entire system in fault tolerance is adopted.

[2] Description of the Operation

Operation is described with reference to FIG. 3. If a call sending signal is received from subscriber 6 (S1), then service control unit 8 performs an analysis of a requested service from the subscriber (S2), performs selection of the appropriate switching units 2 and voice data management units 3 and sends an instruction to selected switching unit 2 to path connect switching system 1 and selected voice data management unit 3 (S3). Upon reception of the connection instruction, switching unit 2 executes operation to connect subscriber 6 and voice data management unit 3. After the line from subscriber 6 is connected up to voice data management unit 3, service control unit 8 instructs voice data management unit 3 to send voice data guidance to subscriber 6 via switching system 1 (S4). Voice data guidance such as a service guidance is sent from voice data management unit 3 to subscriber 6, and subscriber 6 selects an additional service in accordance with the voice data guidance. Service control unit 8 analyzes the service request selected by subscriber 6 (S6) and executes the selected scenario (S7).

When the selected service is a voice data storage service, service control unit 8 sends an instruction to store voice data from the subscriber into voice data storage unit 5 to voice data management unit 3 and voice data storage unit 5 (S71). After the subscriber completes the voice data storage service, service control unit 8 sends an instruction to release the switching unit 2, voice data management unit 3, voice data storage unit 5 and line that have been used (S72).

When the selected service is a voice data reproduction service, the step S7 shown in FIG. 3 is modified in the following manner.

Service control unit 8 sends an instruction to voice data storage unit 5 to reproduce the subscriber voice data stored in voice data storage unit 5 by means of voice data storage unit 5 and to send the reproduced subscriber voice data to voice data management unit 3. Then, service control unit 8 sends an instruction to voice data management unit 3 to send the reproduced voice data of the subscriber sent from voice data storage unit 5 to switching unit 2. Switching unit 2 sends the reproduced voice data of the subscriber sent from voice data management unit 3 to switching system 1 via the line.

[3] Embodiment

Service control unit 8 always grasps the states of all apparatus in the system, and when it is notified from a failed apparatus that a failure has occurred in the apparatus in the system, service control unit 8 selects and controls an alternative apparatus to continue the service.

Further, since service control unit 8 always grasps operating conditions of all components of the system, it can distribute the traffic of services to the individual components in the system. For example, if voice mail services from a particular one of the switching systems 1 are requested in a concentrated manner, service control unit 8 can control so that the traffic processing may not be concentrated on particular ones of the voice data management units 3 and voice data storage units 5. Consequently, the processing capacity of the entire system can be enhanced.

Furthermore, service control unit 8 stores service scenarios for voice mail services in the apparatus, and selects a service scenario in response to an instruction of a service request of a subscriber and executes a service while controlling the individual components. Accordingly, when it is required to add a new service to the voice mail system, the new service can be introduced by rewriting a service scenario of service control unit 8, and consequently, the new service can be introduced without any modifying the individual components.

When a voice data management unit has an additional function of fetching facsimile data, the voice mail system of the present invention can provide a service of storage of facsimile data from a subscriber, which is a kind of new service, in addition to voice data from a subscriber by the same control as that for voice data.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A control system for a voice mail system, comprising:

switching units for path connecting said voice mail system and switching systems connected to subscribers via lines;

voice data management units for producing and sending voice data guidance;

voice data storage units for storing and reproducing voice data; and a service control unit connected to said switching systems via a signaling network for controlling said entire voice mail system; and wherein said service control unit controls the other components of said voice mail system to receive and execute an instruction of a service request from any of said subscribers, and selects, when a first component of an arbitrary kind of said voice mail system is not in an available condition, another second component of the same kind in place of said first component.

2. A control system for a voice mail system as claimed in claim 1, wherein each of said switching units includes:

means for sending subscriber voice data sent from said switching system, which any of said subscribers intends to store, to said voice data management unit designated by said service control unit;

means for sending reproduced voice data of said subscriber or said voice data guidance sent from said voice data management unit to said switching system designated by said service control unit; and means for sending, when said switching unit is not in an available condition, to said service control unit a notification that said switching unit is not in an available condition.

3. A control system for a voice mail system as claimed in claim 2, wherein each of said voice data management units includes:

means for sending said subscriber voice data sent from said corresponding switching unit to said voice data storage unit designated by said service control unit;

means for producing said voice data guidance to be sent to said subscriber via said corresponding switching system and sending said produced voice data guidance to said switching unit designated by said service control unit;

means for sending reproduced voice data of said subscriber voice data reproduced by and sent from said voice data storage unit in which said subscriber voice data are stored to said switching unit designated by said service control unit; and means for sending, when said voice data management unit is not in an available condition, to said service control unit a notification that said voice data management unit is not in an available condition.

4. A control system for a voice mail system as claimed in claim 3, wherein said service control unit includes:

means for selecting, in response to reception of an instruction of a request for a voice mail service from any of said subscribers via said signaling network, an appropriate switching unit and sending an instruction to said selected switching unit to path connect said switching system and said voice data management unit;

means for selecting, in response to said instruction, an appropriate voice data management unit and sending an instruction to said selected voice data management unit to send voice data guidance to said switching system via said line connected to said switching unit;

means for selecting, in response to said instruction, an appropriate voice data storage unit and sending an instruction to said selected voice storage unit to connect said voice data storage unit and said voice data management unit;

means for receiving, in response to said instruction, said instruction of said service request of said subscriber via said voice data management unit and analyzing said requested service of said subscriber;

means for sending, in response to said instruction, an instruction in response to said requested service to said selected switching unit, said voice data management unit and said voice data storage unit;

means for sending, in response to said instruction, an instruction to release said selected switching unit, said voice data management unit, said voice data storage unit and said line after said requested service of said subscriber is executed to said switching unit, said voice data management unit and said voice data storage unit; and means for sending, when at least one of said switching units, said voice data management units and said voice data storage units is not in an available condition, an instruction to change said switching unit, said voice data management unit or said voice data storage unit to be selected.

5. A control system for a voice mail system as claimed in claim 2, wherein each of said voice data storage units includes:

means for writing said subscriber voice data sent from any of said voice data management units into said voice data storage unit designated by said service control unit;

means for reproducing said subscriber voice data stored in said voice data storage unit and sending said reproduced voice data of said subscriber voice data to said voice data management unit designated by said service control unit; and means for sending, when said voice data storage unit is not in an available condition, to said service control unit a notification that said voice data storage unit is not in an available condition.

6. A control system for a voice mail system as claimed in claim 2, wherein said service control unit includes:

means for selecting, in response to reception of an instruction of a request for a voice mail service from any of said subscribers via said signaling network, an appropriate switching unit and sending an instruction to said selected switching unit to path connect said switching system and said voice data management unit;

means for selecting, in response to said instruction, an appropriate voice data management unit and sending an instruction to said selected voice data management unit to send voice data guidance to said switching system via said line connected to said switching unit;

means for selecting, in response to said instruction, an appropriate voice data storage unit and sending an instruction to said selected voice storage unit to connect said voice data storage unit and said voice data management unit;

means for receiving, in response to said instruction, said instruction of said service request of said subscriber via said voice data management unit and analyzing said requested service of said subscriber;

means for sending, in response to said instruction, an instruction in response to said requested service to said selected switching unit, said voice data management unit and said voice data storage unit;

means for sending, in response to said instruction, an instruction to release said selected switching unit, said voice data management unit, said voice data storage unit and said line after said requested service of said subscriber is executed to said switching unit, said voice data management unit and said voice data storage unit; and means for sending, when at least one of said switching units, said voice data management units and said voice data storage units is not in an available condition, an instruction to change said switching unit, said voice data management unit or said voice data storage unit to be selected.

7. A control system for a voice mail system as claimed in claim 1, wherein each of said voice data management units includes:

means for sending said subscriber voice data sent from said corresponding switching unit to said voice data storage unit designated by said service control unit;

means for producing said voice data guidance to be sent to said subscriber via said corresponding switching system and sending said produced voice data guidance to said switching unit designated by said service control unit;

means for sending reproduced voice data of said subscriber voice data reproduced by and sent from said voice data storage unit in which said subscriber voice data are stored to said switching unit designated by said service control unit; and means for sending, when said voice data management unit is not in an available condition, to said service control unit a notification that said voice data management unit is not in an available condition.

8. A control system for a voice mail system as claimed in claim 7, wherein each of said voice data storage units includes:

means for writing said subscriber voice data sent from any of said voice data management units into said voice data storage unit designated by said service control unit;

means for reproducing said subscriber voice data stored in said voice data storage unit and sending said reproduced voice data of said subscriber voice data to said voice data management unit designated by said service control unit; and means for sending, when said voice data storage unit is not in an available condition, to said service control unit a notification that said voice data storage unit is not in an available condition.

9. A control system for a voice mail system as claimed in claim 7, wherein said service control unit includes:

means for selecting, in response to reception of an instruction of a request for a voice mail service from any of said subscribers via said signaling network, an appropriate switching unit and sending an instruction to said selected switching unit to path connect said switching system and said voice data management unit;

means for selecting, in response to said instruction, an appropriate voice data management unit and sending an instruction to said selected voice data management unit to send voice data guidance to said switching system via said line connected to said switching unit;

means for selecting, in response to said instruction, an appropriate voice data storage unit and sending an instruction to said selected voice storage unit to connect said voice data storage unit and said voice data management unit;

means for receiving, in response to said instruction, said instruction of said service request of said subscriber via said voice data management unit and analyzing said requested service of said subscriber;

means for sending, in response to said instruction, an instruction in response to said requested service to said selected switching unit, said voice data management unit and said voice data storage unit;

means for sending, in response to said instruction, an instruction to release said selected switching unit, said voice data management unit, said voice data storage unit and said line after said requested service of said subscriber is executed to said switching unit, said voice data management unit and said voice data storage unit; and means for sending, when at least one of said switching units, said voice data management units and said voice data storage units is not in an available condition, an instruction to change said switching unit, said voice data management unit or said voice data storage unit to be selected.

10. A control system for a voice mail system as claimed in claim 1, wherein each of said voice data storage units includes:

means for writing said subscriber voice data sent from any of said voice data management units into said voice data storage unit designated by said service control unit;

means for reproducing said subscriber voice data stored in said voice data storage unit and sending said reproduced voice data of said subscriber voice data to said voice data management unit designated by said service control unit; and means for sending, when said voice data storage unit is not in an available condition, to said service control unit a notification that said voice data storage unit is not in an available condition.

11. A control system for a voice mail system as claimed in claim 1, wherein said service control unit includes:

means for selecting, in response to reception of an instruction of a request for a voice mail service from any of said subscribers via said signaling network, an appropriate switching unit and sending an instruction to said selected switching unit to path connect said switching system and said voice data management unit;

means for selecting, in response to said instruction, an appropriate voice data management unit and sending an instruction to said selected voice data management unit to send voice data guidance to said switching system via said line connected to said switching unit;

means for selecting, in response to said instruction, an appropriate voice data storage unit and sending an instruction to said selected voice storage unit to connect said voice data storage unit and said voice data management unit;

means for receiving, in response to said instruction, said instruction of said service request of said subscriber via said voice data management unit and analyzing said requested service of said subscriber;

means for sending, in response to said instruction, an instruction in response to said requested service to said selected switching unit, said voice data management unit and said voice data storage unit;

means for sending, in response to said instruction, an instruction to release said selected switching unit, said voice data management unit, said voice data storage unit and said line after said requested service of said subscriber is executed to said switching unit, said voice data management unit and said voice data storage unit; and means for sending, when at least one of said switching units, said voice data management units and said voice data storage units is not in an available condition, an instruction to change said switching unit, said voice data management unit or said voice data storage unit to be selected.

* * * * *